US 8,587,144 B2

(12) United States Patent
Urch

(10) Patent No.: US 8,587,144 B2
(45) Date of Patent: Nov. 19, 2013

(54) POWER GENERATOR

(75) Inventor: Michael John Urch, Prestons (AU)

(73) Assignee: Elemental Energy Technologies, Limited, Sydney (AU)

( * ) Notice: Subject to any disclaimer, the term of this patent is extended or adjusted under 35 U.S.C. 154(b) by 492 days.

(21) Appl. No.: 12/743,126

(22) PCT Filed: Nov. 14, 2008

(86) PCT No.: PCT/AU2008/001705
§ 371 (c)(1),
(2), (4) Date: Sep. 13, 2010

(87) PCT Pub. No.: WO2009/062262
PCT Pub. Date: May 22, 2009

(65) Prior Publication Data
US 2011/0115230 A1  May 19, 2011

(30) Foreign Application Priority Data

| Nov. 16, 2007 | (AU) | ................................. | 2007906278 |
| Nov. 16, 2007 | (AU) | ................................. | 2007906279 |
| Nov. 16, 2007 | (AU) | ................................. | 2007906281 |
| Jun. 18, 2008 | (AU) | ................................. | 2008903101 |

(51) Int. Cl.
*F03B 13/00* (2006.01)
*H02P 9/04* (2006.01)
*F03D 9/00* (2006.01)

(52) U.S. Cl.
USPC .............................................. 290/54; 290/55

(58) Field of Classification Search
USPC ..................................................... 290/54, 55
See application file for complete search history.

(56) References Cited

U.S. PATENT DOCUMENTS

| 565,022 A |   | 8/1896 | Newburg ........................... 415/7 |
| 622,474 A | * | 4/1899 | Hoskin ............................ 415/72 |

(Continued)

FOREIGN PATENT DOCUMENTS

| CN | 2333832 Y | 8/1999 |
| WO | WO 01/09516 A1 | 2/2001 |

(Continued)

OTHER PUBLICATIONS

International Search Report from the Australian Patent Office for International Application No. PCT/AU2008/001705, mailed Mar. 26, 2009.
Hungarian Intellectual Property Office, Written Opinion for Application No. 201003391-8, mailed Dec. 2, 2011, 8 pages.

(Continued)

*Primary Examiner* — Pedro J Cuevas
(74) *Attorney, Agent, or Firm* — Finnegan, Henderson, Farabow, Garrett & Dunner, L.L.P.

(57) ABSTRACT

A power generator assembly (10*a*) for using kinetic energy from a flowing fluid (12) to generate power. The power generator assembly (10*a*) includes a blade assembly (14) and a generator (30). The blade assembly (14) has a head end (16) for facing oncoming flowing fluid (12), a tail end (18) spaced from the head end (16) for facing in the direction of flow of the fluid (12), and a rotational axis (20) extending between the head end (16) and the tail end (18). The blade assembly (14) includes a blade arrangement (22) which is arranged in generally helical fashion about the rotational axis (20), and at least one mounting formation (24) connected to the blade arrangement (22). Each mounting formation (24) is adapted to permit mounting of the blade assembly (22) for rotation about its rotational axis (20), so that in use fluid (12) flowing past the power generator assembly (10*a*) interacts with the blade arrangement (22) to rotate the blade assembly (24) about its rotational axis (20). The generator (30) is drivingly connected to the blade assembly (22) for generating power in response to rotation of the blade assembly (22).

38 Claims, 8 Drawing Sheets

(56) References Cited

U.S. PATENT DOCUMENTS

| | | | | |
|---|---|---|---|---|
| 1,345,022 | A * | 6/1920 | Oliver | 415/4.3 |
| 3,233,574 | A * | 2/1966 | Justinien | 416/84 |
| 3,818,704 | A * | 6/1974 | Lapeyre | 60/504 |
| 3,986,787 | A * | 10/1976 | Mouton et al. | 415/7 |
| 4,025,220 | A * | 5/1977 | Thompson et al. | 415/7 |
| 4,143,999 | A | 3/1979 | Ryall | 417/423.6 |
| 4,166,596 | A * | 9/1979 | Mouton et al. | 244/30 |
| 4,218,175 | A * | 8/1980 | Carpenter | 415/219.1 |
| 4,219,303 | A * | 8/1980 | Mouton et al. | 415/7 |
| 4,258,271 | A | 3/1981 | Chappell et al. | 290/54 |
| 4,293,274 | A * | 10/1981 | Gilman | 416/51 |
| 4,324,985 | A * | 4/1982 | Oman | 290/55 |
| 4,412,417 | A * | 11/1983 | Dementhon | 60/497 |
| 4,524,285 | A * | 6/1985 | Rauch | 290/43 |
| 4,600,360 | A * | 7/1986 | Quarterman | 415/148 |
| 4,684,316 | A * | 8/1987 | Karlsson | 415/211.1 |
| 4,720,640 | A * | 1/1988 | Anderson et al. | 290/43 |
| 4,816,697 | A * | 3/1989 | Nalbandyan et al. | 290/54 |
| 4,849,647 | A * | 7/1989 | McKenzie | 290/54 |
| 5,005,356 | A * | 4/1991 | Saunders | 60/330 |
| 5,017,087 | A * | 5/1991 | Sneddon | 415/72 |
| 5,311,749 | A | 5/1994 | McAuliffe et al. | 62/402 |
| 5,946,909 | A * | 9/1999 | Szpur | 60/398 |
| 6,139,255 | A * | 10/2000 | Vauthier | 415/7 |
| 6,168,373 | B1 * | 1/2001 | Vauthier | 415/7 |
| 6,357,997 | B1 | 3/2002 | Rosefsky | 415/60 |
| 6,406,251 | B1 * | 6/2002 | Vauthier | 415/7 |
| 6,409,466 | B1 * | 6/2002 | Lamont | 415/3.1 |
| 6,626,638 | B2 * | 9/2003 | Rosefsky | 415/4.3 |
| 6,756,696 | B2 * | 6/2004 | Ohya et al. | 290/55 |
| 7,044,711 | B2 * | 5/2006 | Duncan, Jr. | 416/198 R |
| 7,147,428 | B2 * | 12/2006 | Lamont | 415/1 |
| 7,287,954 | B2 * | 10/2007 | Kinkaid et al. | 415/4.2 |
| 7,948,110 | B2 * | 5/2011 | Morgan et al. | 290/55 |
| 7,976,268 | B2 * | 7/2011 | Presz et al. | 415/4.3 |
| 7,976,269 | B2 * | 7/2011 | Presz et al. | 415/4.3 |
| 7,976,270 | B2 * | 7/2011 | Presz et al. | 415/4.3 |
| 7,980,811 | B2 * | 7/2011 | Presz et al. | 415/4.3 |
| 8,021,100 | B2 * | 9/2011 | Presz et al. | 415/4.3 |
| 8,022,567 | B2 * | 9/2011 | Davis et al. | 290/54 |
| 8,084,881 | B2 * | 12/2011 | Morgan et al. | 290/55 |
| 8,148,839 | B2 * | 4/2012 | Rosefsky | 290/52 |
| 8,344,535 | B2 * | 1/2013 | Pitre | 290/54 |
| 2005/0074322 | A1 * | 4/2005 | Duncan, Jr. | 415/2.1 |
| 2005/0189199 | A1 | 9/2005 | Henry | 198/657 |
| 2007/0041823 | A1 | 2/2007 | Miller | 415/4.1 |
| 2007/0077145 | A1 * | 4/2007 | Kinkaid et al. | 416/197 A |
| 2008/0191487 | A1 * | 8/2008 | Morgan et al. | 290/55 |
| 2008/0246284 | A1 * | 10/2008 | Pelman et al. | 290/55 |
| 2009/0189395 | A1 * | 7/2009 | Ryynanen et al. | 290/53 |
| 2009/0295293 | A1 * | 12/2009 | Lawton et al. | 315/76 |
| 2010/0320771 | A1 * | 12/2010 | Urch | 290/55 |

FOREIGN PATENT DOCUMENTS

| | | | |
|---|---|---|---|
| WO | WO 2006/059094 A1 | 6/2006 | |
| WO | WO 2009062261 A1 * | 5/2009 | F03B 17/06 |

OTHER PUBLICATIONS

Hungarian Intellectual Property Office, Search Report for Application No. 201003391-8, mailed Dec. 2, 2011, 8 pages.

* cited by examiner

POWER GENERATOR

TECHNICAL FIELD

The present invention relates generally to a power generator, and more particularly to an electrical power generator assembly for using kinetic energy from a flowing fluid to generate electrical power. The power generator is also suitable for producing other forms of power, such as hydraulic power.

The present invention relates also to an electrical power generator installation including such electrical power generator. The present invention is expected to be particularly advantageously, but not exclusively, used in the context of hydro-powered electricity generation.

The present invention is also adaptable for use as a propulsion or pump device.

BACKGROUND OF THE INVENTION

Kinetic energy in flowing fluids, such as water and wind, is a known alternative to energy sources such as bio-fuels and fossil fuels for generating power. Unlike, for is example, bio- and fossil fuel which, when used in power generation, go hand-in-hand with emission of harmful combustion gasses into the atmosphere, generation of power by using flowing fluids has no or very little adverse effects on the atmosphere. Although known installations for harvesting wind power generally have low running costs, they tend to be expensive to install and have relatively low generation capacity. Known installations for harvesting hydropower, for example tidal power, on the other hand, have relatively higher generation capacity. However, these types of installations too are expensive, require frequent maintenance, and can be unreliable due to problems associated with silting and corrosion.

Object of the Invention

It is the object of the present invention to substantially overcome or at least ameliorate one or more of the above disadvantages, or at least to provide a useful alternative.

SUMMARY OF THE INVENTION

Accordingly, in a first aspect, the present invention provides a power generator assembly for using kinetic energy from a flowing fluid to generate power, the power generator assembly including:

a blade assembly having a head end for facing oncoming flowing fluid, a tail end spaced from the head end for facing in the direction of flow of the fluid, and a rotational axis extending between the head end and the tail end, the blade assembly including a blade arrangement which is arranged in generally helical fashion about the rotational axis, and at least one mounting formation connected to the blade arrangement, each mounting formation being adapted to permit mounting of the blade assembly for rotation about its rotational axis, so that in use fluid flowing past the power generator assembly interacts with the blade arrangement to rotate the blade assembly about its rotational axis; and a generator drivingly connected to the blade assembly for generating power in response to rotation of the blade assembly.

In one form, the power generator is an electrical power generator and includes an electrical generator drivingly connected to the blade assembly.

In another form, the power generator is a hydraulic power generator and includes a hydraulic generator drivingly connected to the blade assembly. Preferably, the hydraulic generator is in turn connected to an electric generator.

In yet another form, the power generator converts mechanical power from the blade assembly into another form of energy to do useful work.

In a second aspect, the present invention provides a propulsion or pump device adapted to eject a fluid, the propulsion device including:

a blade assembly having a head end for fluid inlet, a tail end spaced from the head end and facing in the direction of fluid outlet, and a rotational axis extending between the head end and the tail end, the blade assembly including a blade arrangement which is arranged in generally helical fashion about the rotational axis, and at least one mounting formation connected to the blade arrangement, each mounting formation being adapted to permit mounting of the blade assembly for rotation about its rotational axis, so that in use fluid drawn past the propulsion device interacts with the blade arrangement during rotation of the blade assembly about its rotational axis; and a motor drivingly connected to the blade assembly for rotating the blade assembly to cause fluid flow from the tail end section.

The blade assembly preferably includes an elongated shaft extending between the head end and the tail end of the blade assembly, the shaft having a longitudinal axis defining the rotational axis of the blade assembly, and the blade arrangement being mounted on and radiating from the shaft. The generator is preferably drivingly connected to the shaft. The blade arrangement preferably terminates shy of the ends of the shaft, with each mounting formation being provided by an end portion of the shaft, so that in use, the shaft, and accordingly the blade assembly, is rotatably mounted or supported. Preferably, each mounting formation includes a bearing element mounted on the shaft and adapted to be connected to a support structure, to permit rotation of the blade assembly relative to said support structure.

In one embodiment, the blade arrangement preferably includes a plurality of beams which are longitudinally spaced in said generally helical fashion along the shaft. In this embodiment, each beam is preferably mounted on the shaft such that it is adjustably rotatable around the rotational axis of the shaft, to permit adjustment of the pitch of the blade assembly. The blade arrangement, in this embodiment, further preferably includes a web or skin extending along the lengths of and connected to each pair of adjacent beams, such that the blade arrangement, irrespective of the pitch of each beam, is uninterrupted across its surface.

In another embodiment, if desired, the blade arrangement preferably includes one or more continuous helical blades.

Preferably, the blade arrangement, when seen in side elevation, tapers from the head end thereof to its tail end.

The power generator assembly preferably also includes an elongated open-ended shroud extending between the head end and the tail end of the blade assembly, the shroud being connected to and surrounding the blade assembly, so that the shroud rotates with the blade assembly in use. The shroud too thus has a head end and a tail end. Preferably, the shroud is connected to the tip of each blade of the blade arrangement, the connection between the shroud and each blade being a substantially fluid impervious connection. Likewise, in the embodiment where the blade arrangement includes a plurality of beams and said webs or skins, a tip of each web or skin is, preferably, also connected to the shroud. Preferably, the connections between the webs or skins and the shroud are substantially fluid impervious connections. In use, flowing fluid interacting with the blade arrangement to rotate the power generator assembly thus enters the shroud from its head end and exits the shroud via its tail end.

Preferably, the shroud is of thin wall construction, and converges along at least part of its length from its head end to its tail end, said convergence corresponding to the tapering of the blade assembly.

The shroud, preferably, is of multi-section or unitary moulded construction, having a head end section via which a flowing fluid enters the shroud, a tail end section via which flowing fluid exits the shroud, and an elongated intermediate section extending between the head end section and the tail end section, with the intermediate section converging from the head end section towards the tail end section. Advantageously, the head end section of the shroud converges towards the intermediate section, and the tail end section diverges away from the intermediate section, such that the shroud is generally in the form of a converging-diverging venturi having a converging elongated throat defined by the intermediate section.

Preferably, the shroud has a circular cross-sectional profile, and the head end section of the shroud is flared in bell mouth fashion. More preferably, both of the head end section and the tail end section of the shroud are flared in bell mouth fashion.

Each mounting formation preferably includes a bearing element connected to an end section of the shaft, the bearing elements in use being mounted on an anchored support structure, such that the power generator assembly rotates relative to the support structure.

The electrical power generator is preferably in the form of a dynamo or alternator mounted on an end section of the shaft of the blade assembly and anchored to the support structure.

In a third aspect, the present invention provides a power generator for using kinetic energy from a flowing fluid to generate power, the power generator including:

a blade assembly having a head end for facing oncoming flowing fluid, a tail end spaced from the head end for facing in the direction of flow of the fluid, and a rotational axis extending between the head end and the tail end, the blade assembly including a blade arrangement which includes a plurality of beams spaced along the length of the rotational axis between the head end and the tail end of the blade assembly, and at least one mounting formation connected to the blade arrangement, each mounting formation being adapted to permit mounting of the blade assembly for rotation about its rotational axis, so that in use fluid flowing past the power generator assembly interacts with the blade arrangement to rotate the blade assembly about its rotational axis; and a generator drivingly connected to the blade assembly for generating power in response to rotation of the blade assembly.

In one form, the power generator is an electrical power generator and includes a electrical generator drivingly connected to the blade assembly.

In another form, the power generator is a hydraulic power generator and includes a hydraulic generator drivingly connected to the blade assembly. Preferably, the hydraulic generator is in turn connected to an electric generator.

In a fourth aspect, the present invention provides a propulsion or pump device adapted to eject a fluid, the propulsion device including:

a blade assembly having a head end for fluid inlet, a tail end spaced from the head end and facing in the direction of fluid outlet, and a rotational axis extending between the head end and the tail end, the blade assembly including a blade arrangement which includes a plurality of beams spaced along the length of the rotational axis between the head end and the tail end of the blade assembly, and at least one mounting formation connected to the blade arrangement, each mounting formation being adapted to permit mounting of the blade assembly for rotation about its rotational axis, so that in use fluid drawn past the propulsion device interacts with the blade arrangement during rotation of the blade assembly about its rotational axis; and a motor drivingly connected to the blade assembly for rotating the blade assembly to cause fluid flow from the tail end section.

The beams of the blade assembly are preferably arranged in generally helical fashion about the rotation axis.

Preferably, the features or components of the power generator according to this aspect of the invention, are similar to those of the power generator according to the preceding aspect of the invention, when the blade arrangement of such power generator includes a plurality of beams.

In a fifth aspect, the present invention provides an electrical power generator installation, the installation including:

an electrical power generator assembly as hereinbefore described; and a support structure, the power generator assembly being mounted, by means of each mounting formation thereof, on the support structure for rotation of the power generator assembly about the rotational axis of its blade arrangement.

In the case of tidal energy or ocean stream power generation, the power generator will be submerged in the ocean. In the case of river flow power generation, the power generator will be mounted in a river or flowing stream. In the case where the flowing fluid with which the power generator is associated is wind, the power generator will be located in an open area where it will be exposed to flow of air when the wind blows.

In one embodiment, the support structure includes a network of flexible elements, for example (heavy) chains or cables. The network of flexible elements are, preferably, arranged such that the generator can be aligned with the head end thereof facing oncoming flowing fluid, preferably so that it aligns itself, in accordance with the direction of flow of the fluid. In this embodiment, the network of flexible elements can, preferably, be arranged such that the electrical power generator assembly is mounted thereon in the general fashion of a windsock. In another embodiment, the support structure is a rigid structure including a network of rigid elements.

In a further variation, the power generator assembly includes a stator in front of the shroud, most preferably adjacent the shroud head end section. The stator preferably includes one or more blades of adjustable pitch.

In a yet variation, the power generator assembly includes a slotted ejector arrangement behind the shroud, most preferably adjacent the shroud tail end section. In one form, the slotted ejector arrangement is connected to, and rotates with, the shroud. In another form, the slotted ejector arrangement is connected to the support structure and does not rotate with the shroud. In one embodiment, the slotted ejector arrangement includes a plurality of spaced apart tubular sections, and most preferably diverges diametrically away from the shroud. In another embodiment, the slotted ejector arrangement is of unitary construction, with a helical slot therein, and preferably diverges diametrically away from the shroud.

BRIEF DESCRIPTION OF THE DRAWINGS

Preferred embodiments of the present invention will now be described, by way of examples only, with reference to the accompanying drawings wherein.

DETAILED DESCRIPTION OF THE PREFERRED EMBODIMENTS

Figure 1:
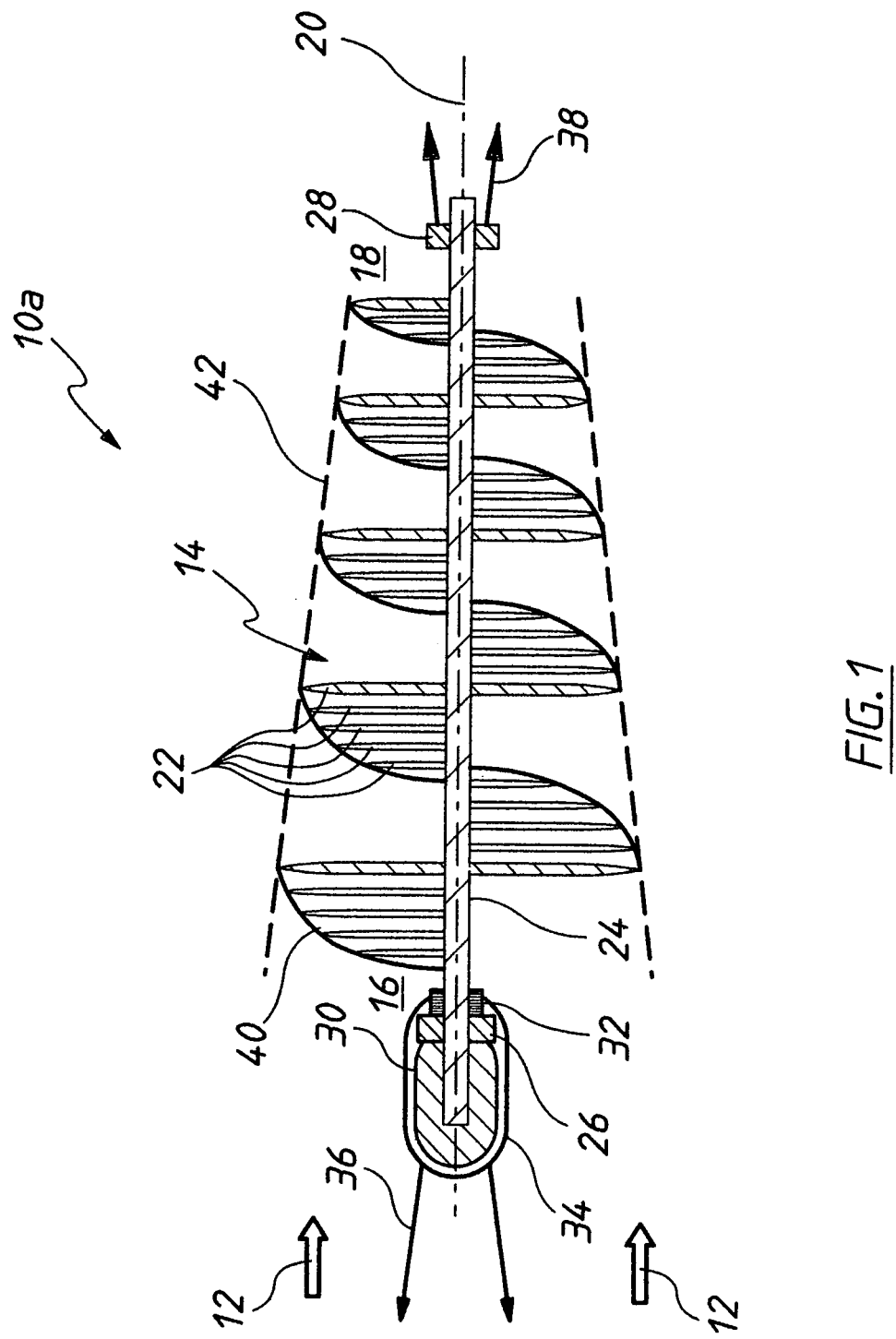
FIG. 1 is a schematic cross sectional view of a first embodiment of a power generator.

FIG. 1 shows schematically a first embodiment of an electrical power generator assembly 10a, which is driven by the kinetic energy of a flowing fluid 12, such as a tidal current, ocean stream, river flow or wind, to generate electrical power. The generator assembly 10a includes a blade assembly 14 with a head end 16 facing the oncoming flow of the fluid 12 and a tail end 18, spaced from the head end 16, which faces in the direction of the flow of the fluid 12.

The blade assembly 14 has a rotational axis 20 extending between the head end 16 and the tail end 18. The blade assembly 14 also has a blade arrangement, in the form of a series of independent beams 22 which are arranged in a generally helical fashion about the rotational axis 20. The blade assembly 14 also includes a mounting formation in the form of a shaft 24 supported by head end bearings 26 and tail end bearings 28. The shaft 24 is connected to an electrical generator 30 via a seal 32. The generator 30 is contained within a housing 34. Stay cables 36 and 38 are attached to the housing 34 and the bearing 28 respectively, which locate the assembly 10a and resist movement of the assembly 10a in the fluid flow 12.

The beams 22 are connected to the shaft 24 with sufficient clearance so they can s rotated about the axis 20 with respect to each other. The beams 22 are held in place at the head end 16 of the shaft 24 via a flange (not shown) and, at the tail end 18, the shaft 24 is threaded and a nut (not shown) is tightened to apply force along the shaft 24 and lock the beams 22 in place. Optionally, a skin or web 40 can be wound around the beams 22, the skin 40 being able to expand and contract with the changing pitch of the beams 22.

The length of each of the beams 22 decreases as they wind around the shaft 24 from the head end 16 to the tail end 18 within a generally frusto-conical boundary 42.

In use, the blade assembly 14 is mounted within the fluid flow 12 which imparts its energy to the skin 40 and beams 22. As the fluid flow 12 applies a force to the beams 22, the beams 22 react by imparting a rotational force or torque to the shaft 24. The is rotation of the shaft 24 is transferred to the generator 30, producing electricity. If desired, the electrical generator is replaced with a hydraulic generator which produces hydraulic power. The hydraulic power can be used to power, via undersea hydraulic cables, an electrical generator on the shore.

In yet another form, the power generator 10a can be configured to convert mechanical power from the blade assembly 14 into another form of energy to do useful work.

The beams 22 can also be configured to, direct the fluid flow 12 radially inwards towards the shaft 24 in order to minimise fluid escaping the boundary 42 of the housing. To do this, the beams 22, when viewed in the direction of the axis 20, are twisted and significantly curved inwards (in their direction of rotation) at their ends to act like 'cups' and direct the fluid flow towards the axis 20. As the fluid flow 12 continues to flow through the blade assembly 8, the cross sectional area of the flow decreases and its pressure decreases. As its pressure decreases, the velocity of fluid flow increases such that a maximum amount of energy is transferred from the fluid flow 12 to the beams 22. As a result, the generator assembly 10a behaves like a reaction turbine, which are normally associated with medium head flows rather than zero head free flows. As the velocity of the fluid flow 12 changes, the rotational alignment (ie. pitch) of the beams 22 can be altered in order to operate the generator assembly 10 at maximum efficiency or power output. This advantageously allows the turbine efficiency and power output to be significantly increased for a range of flow velocities. The generator 30 can also include a gear box to change its speed of rotation and increase its efficiency.

Optionally, the (tail end) stays 38 and the bearing 28 can be removed which allows the blade assembly 14 to find an optimal alignment in the fluid flow 12, in a similar manner to that of a wind sock. In this configuration, the bearing 26 may be replaced with a universal type joint, which connects the shaft 24 to the generator 30. This allows the blade assembly 14 to act akin to a kite and optimally align itself without transmitting large radial forces to the generator 30.

Figure 2:
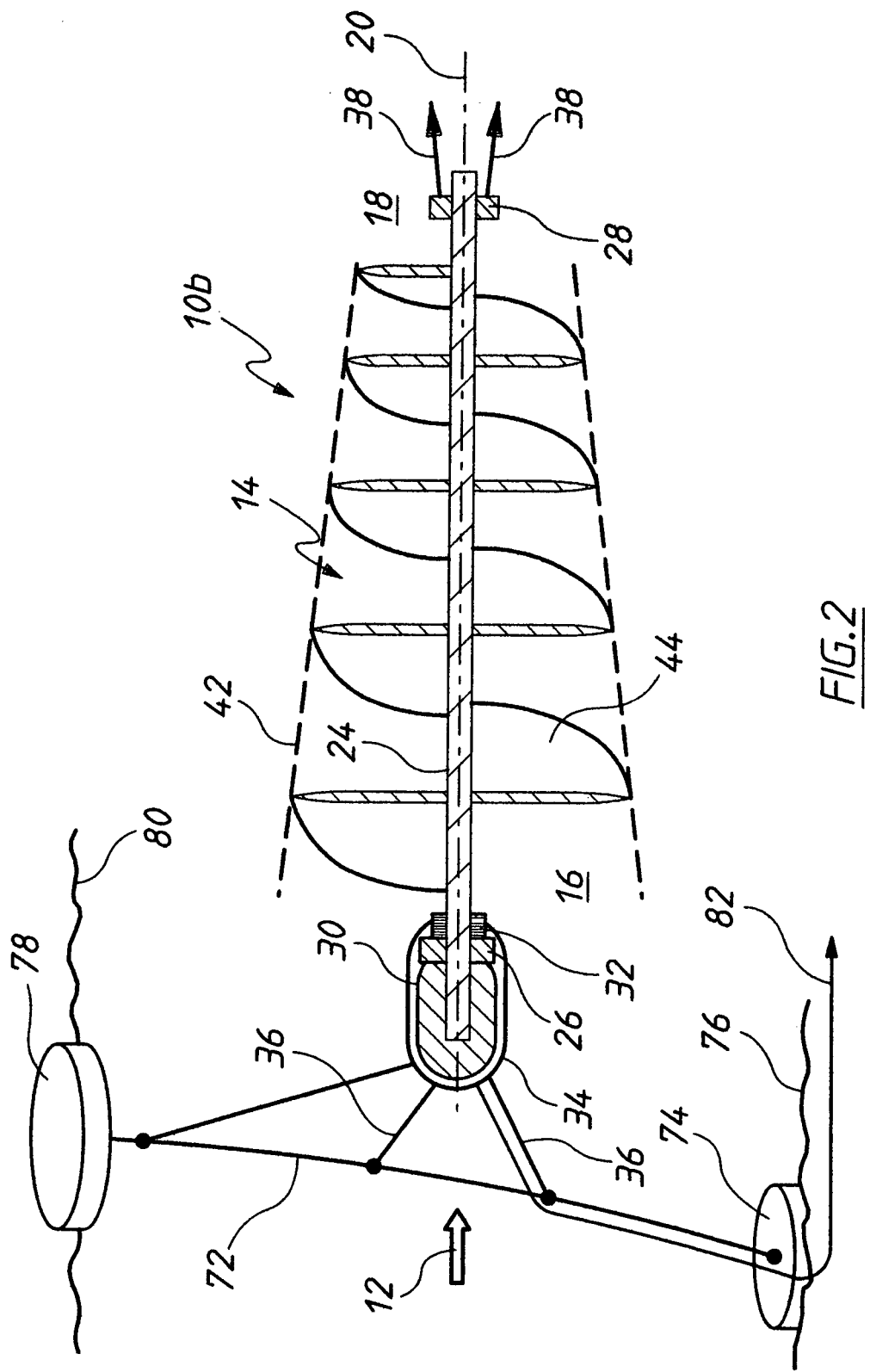
FIG. 2 is a schematic cross sectional view of a second embodiment of a power generator.

FIG. 2 shows a second embodiment of an electrical power generator assembly 10b. The assembly 10b is similar to that shown in FIG. 1 and like reference numerals to those used in the first embodiment shall be used to indicate like features in FIG. 2.

However, in the second embodiment, the blade assembly 14 is in the form of a plurality, in this case a pair, of equiangularly spaced helical blades 44. Other numbers of the equiangularly spaced helical blades (eg. 3, 4 or 5 etc) can also be used. Further, the (head end) stay cables 36 are connected to a vertical buoy cable 72 which extends between an anchor 74 secured to the seabed 76 and a buoy 78 adjacent the ocean surface 80. If desired, the (tail end) stay cables 38 and the bearing 28 can be removed so that the assembly 10b finds its own optimal alignment in a manner of a wind sock, as previously described.

In this embodiment, electricity from the generator 30 can be transmitted to land via under sea electrical cables 82 which preferably follow the lower part of buoy cable 72 to the anchor 74 and then run along the seabed 76 to shore.

Optionally, the generator 30 can be replaced with a motor which applies torque to the shaft 24 which in turn produces rotational motion of the helical blade 44 and provides a thrust in the fluid from the tail end section 16 to propel a craft or pump the fluid.

Optionally, the stay cables 36, 38 can be connected to a suitable support structure installed in the ocean or, alternatively, can be connected to a bridge or set of cables spanning an ocean inlet or set of support structures. In a further variation, a fly wheel (not shown), can be attached to the shaft 24 in order to store rotational energy and reduce fluctuations in rotational power due to turbulence in the fluid flow 12. In this configuration, the power generator assembly 10b may not be self starting. If this is the case, the generator 30 can be used as a motor to apply a torque to the shaft 24 in order to start the blade assembly 14 rotating.

Figure 3:
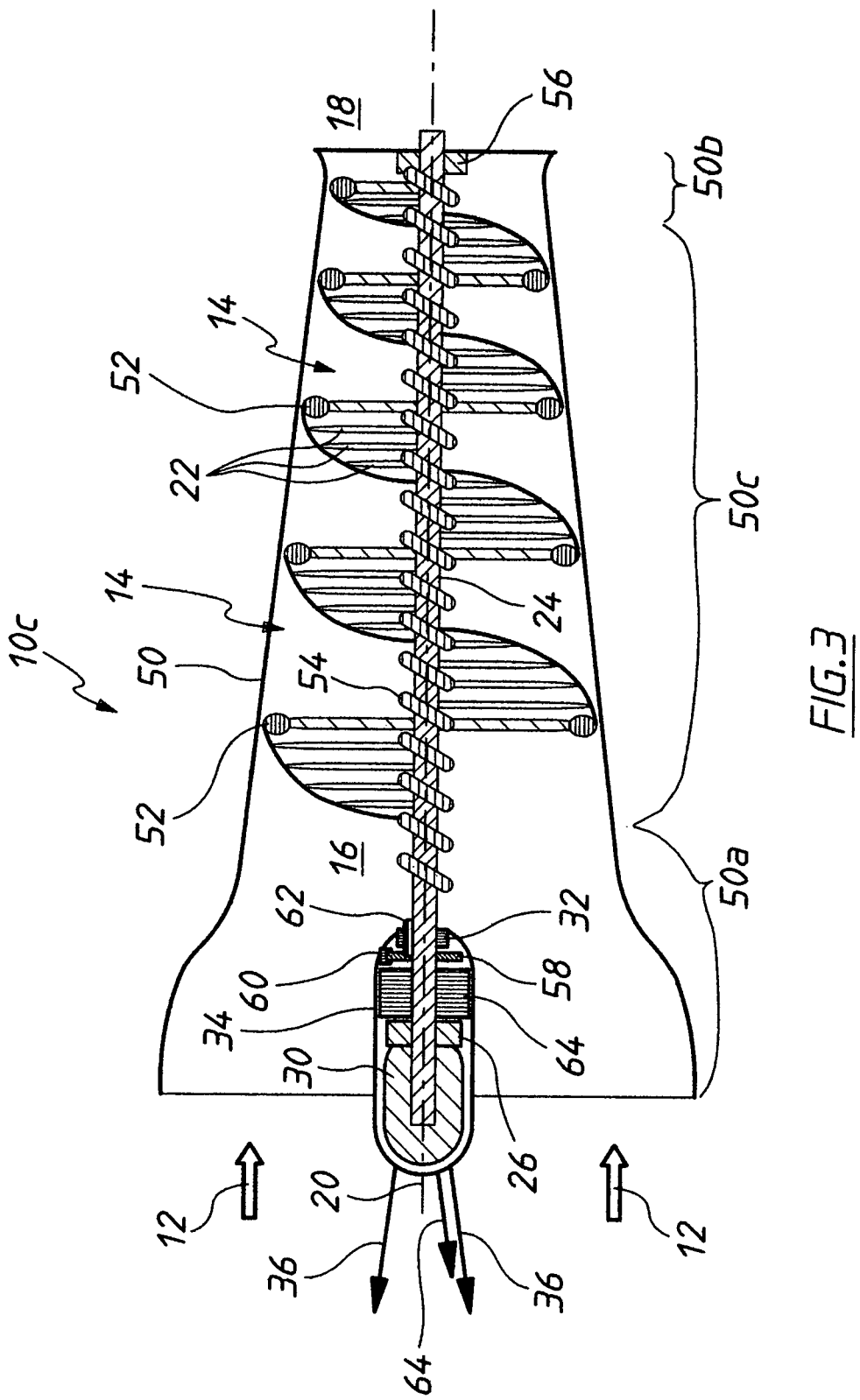
FIG. 3 is a schematic cross sectional view of a third embodiment of a power generator.

FIG. 3 shows a third embodiment of an electrical power generator assembly 10c. The assembly 10c is similar to those shown in FIGS. 1 and 2 and like reference numerals to those used in describing the first and second embodiments shall be used to indicate like features in FIG. 3.

In the third embodiment, the assembly 10c is configured as a turbine for converting fluid/hydro power into rotational power and then electricity. More particularly, the blade assembly 14 is housed within a generally frusto-conical shroud 50. The distal end of the beams 22 each include a roller 52 which allows axial rotation of each of the beams 22 with respect to each other to occur inside the shroud 50 while still maintaining structural integrity and adequate fluid sealing between the exterior of the beams 22 and the interior of the shroud 50.

The shroud 50 is of multi section or unitary moulded construction having a head end section 50a, via which the flowing fluid 12 enters the shroud 50, a tail end section 50b, via which the flowing fluid 12 exits the shroud 50, and an elongated intermediate section 50c extending between the head end section 50a and the tail end section 50b. The intermediate section 50c also converges in diameter from the head end section 50a towards the tail end section 50b. The head end section 50a of the shroud 50 also converges towards the intermediate section 50c and the tail end section 50b diverges away from the intermediate section 50c such that the shroud 50 is generally in the form of a converging-diverging venturi having a converging elongated throat defined by the intermediate section 50c. At all points along its length, the shroud 50 has a circular cross-sectional profile. The shroud head end section 50a, being shaped as a venturi, produces an area of low pressure behind the blade assembly 14 which advantageously results in a much freer flow of fluid through and exiting the shroud 50. Further, as the shroud 50 is bonded to the blades 22, the shroud 50 rotates in conjunction with the blades 22 and the rotational motion of the shroud 50 induces a swirl or vortex in front of the shroud 50. This vortex is advantageous as it models a whirlpool (as found in nature) and sucks additional fluid into the blade assembly 14 than would otherwise pass through it. The shroud 50 can also be of unitary moulded construction, for increased strength.

The shaft 24 in this embodiment is surrounded by a long helical spring 54 which serves to maintain the pitch position of each of the beams 22 whilst keeping a consistent helical (screw) shape in the overall blade assembly 14. The tail end of the spring 54 is attached to the shaft 24 by a spring locking clamp 56. By securing one end of the spring 54 using the clamp 56, and applying a torque to the spring 54, the spring 54 changes shape such that each of the beams 22 will uniformly rotate about the axis 20 with respect to each other and subsequently change the pitch of the blade assembly 14. To apply such a torque, the spring 54 is attached to a disc 58 which can be held rotationally secure by brake pads 60, which are secured to the generator housing 34. During manufacture, the spring 54 is installed with zero torque in its neutral position with the beams 22 in the centre of their pitch adjustment. In normal operation, the pitch of the spring 54 is secured by a disc lock 62 attached to the shaft 24, such that the disc 58 and spring 54 rotate together with the shaft 24. To increase the pitch of the blades 22, the disc lock 62 is disengaged and the generator 30 receives power, from an electrical cable 64, such that it becomes a motor. In this form, the generator can apply torque to the shaft 24 in a direction to reduce spring tension which has the affect of increasing the pitch in the spring 54 while the disc pads 60 are tightened so that the disc 58 cannot rotate. The shaft 24 rotates whilst the spring 54 is held secure and it increases its pitch which subsequently axially rotates the beams 22 with respect to each other and increases the pitch of the blade assembly 14.

To reduce the pitch of the beams 22, the disc lock 62 is disengaged and the generator 30 is powered to apply torque to the shaft 24 in the direction to increase spring tension and subsequently reduce the pitch in the spring 54, while the brake pads 60 are applied to prevent rotation of the disc 58. The shaft 24 rotates whilst the spring 54 is held secure and it reduces its pitch, which subsequently rotates the beams 22 about their longitudinal axes with respect and reduces the pitch of the blade assembly 14.

The assembly 10c also includes a fly wheel 64 attached to the shaft 24 in order to store rotational energy and reduce fluctuations in rotational power due to turbulence in the fluid flow 12. Alternatively, a separate motor and gear can be installed inside the generator housing 34, in communication with the shaft 24, which can apply torque to the shaft 24 to change the pitch of the spring 54, and thus change the pitch of the blade assembly 14. This allows the pitch of the blade assembly 14 to be changed during normal operation of the generator assembly 10c.

Figure 4:
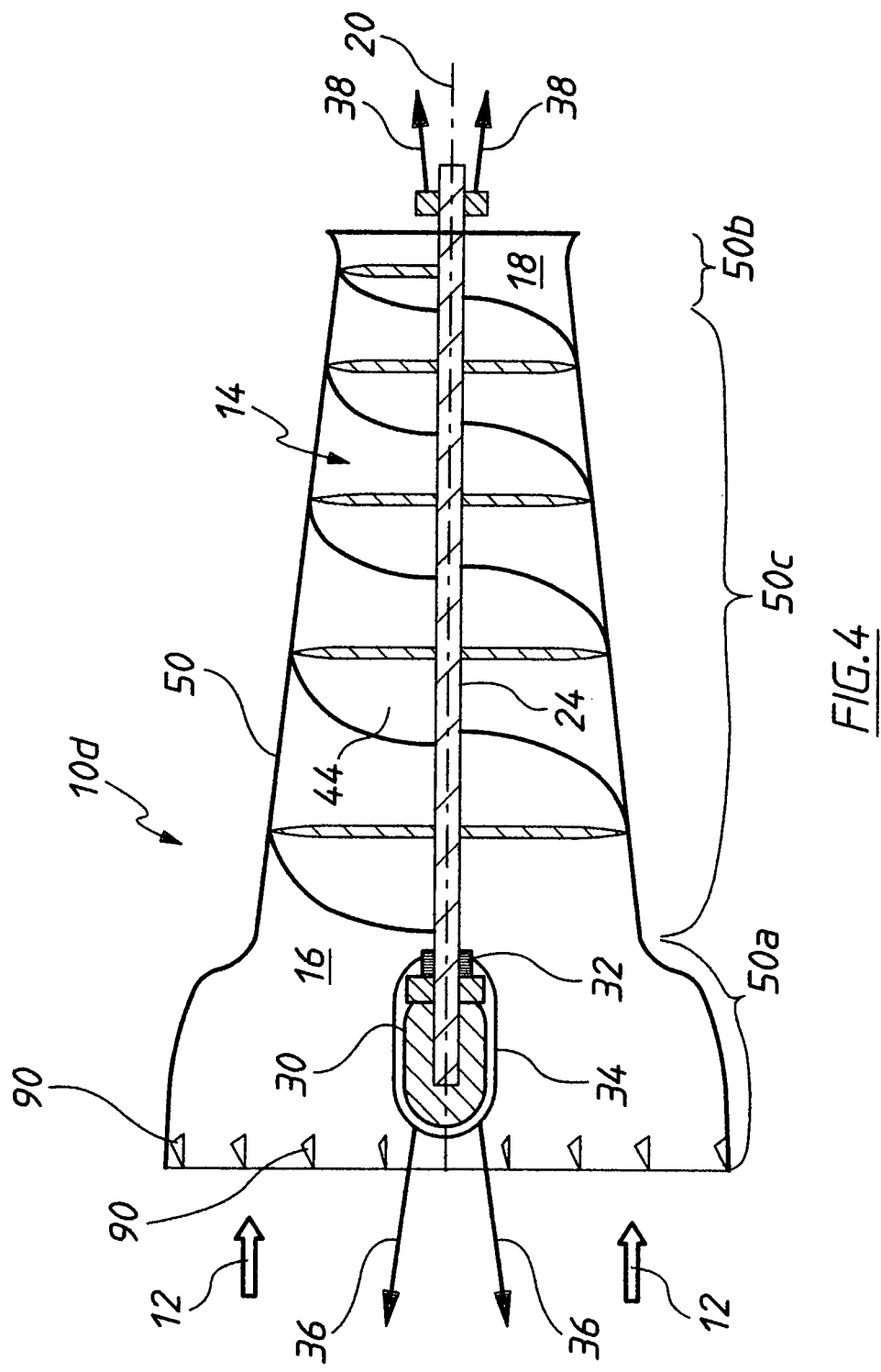
FIG. 4 is a schematic cross sectional view of a fourth embodiment of a power generator.

FIG. 4 shows a fourth embodiment of an electrical power generator assembly 10d. Once again, like features to those described with reference to earlier embodiments are denoted with like reference numerals.

The assembly 10d has a plurality, in this case, a pair, of equiangularly spaced helical blades 44, similar to that shown in FIG. 2, and a shroud 50, similar to that shown in FIG. 3. Other numbers of the equiangularly spaced helical blades (eg. 3, 4 or 5 etc) can also be used. The blades 44 reduce in diameter as they wind around the shaft 24 from the head end 16 to the tail end 18 following the internal dimension of the shroud 50. The distal ends of the blades 44 are also bonded to the interior surface of the shroud 50. As a result, in use, the shroud 50 rotates with the blades 44, which creates a vortex in front of the shroud 50. Vanes 90 may be installed on the leading edge of the shroud head end section 50a in order to further increase the vortex induced in front of the shroud 50. This vortex is further aided by the increased velocity of the tips of the blades 44 at the entry of the head end 16 of the blade assembly 14 in creating suction pressure at the head end 16 of the shroud 50. The combination of: decreased pressure inside the shroud 50; decreased pressure behind the shroud 50; the rotating shroud 50 inducing a vortex in front of the blade assembly 14; the flow vanes inducing a vortex in front of the blade assembly 14; and the smaller pitch of the blades at the entry of the blade assembly 14 results in substantially more fluid being sucked into the blade assembly 14 than would otherwise occur. The increased fluid passing through the blade assembly 14 dramatically increases the power output of the assembly 10d.

Figure 5:
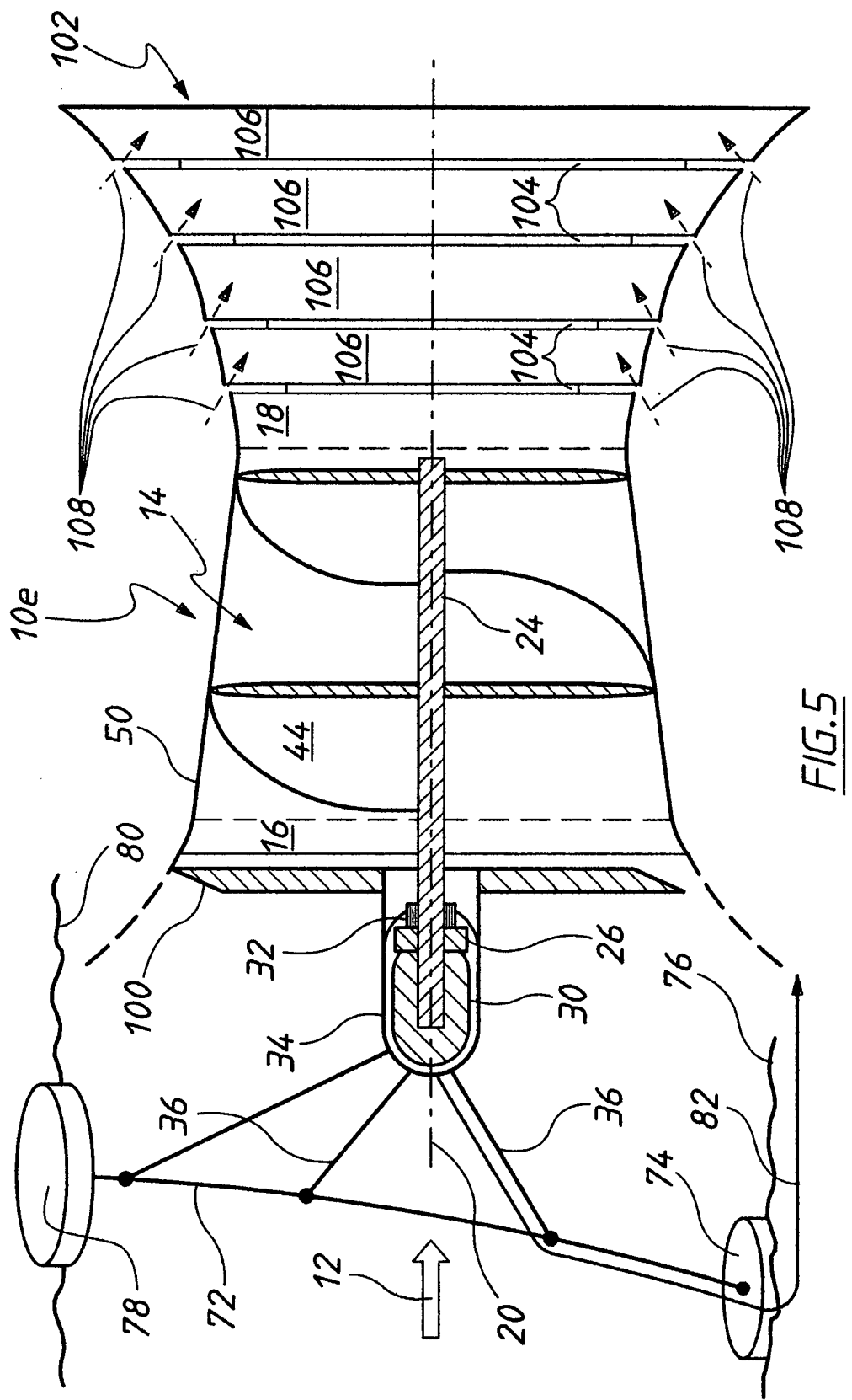
FIG. 5 is a schematic cross sectional view of a fifth embodiment of a power generator.

FIG. 5 shows a fifth embodiment of an electric power generator assembly 10e. Like features to those described with reference to earlier embodiments are again denoted with like reference numerals.

In the assembly 10e, a stator 100 is positioned just in front of the shroud 50. The stator 100 acts to condition the flow entering the blade 44. The stator 100 is connected to the housing 34 and has blades which are rotatable about their longitudinal axes in order to adjust their pitch.

In use, the fluid flow 12 enters the blades of the dynamic stator 100, which are at an angle to the fluid flow 12, and the stator 100 imparts a rotational or swirl motion to the fluid flow 12, adding an angular momentum component, preferably in the direction of rotation of the blade assembly 14. The fluid flow 12 then enters the blade assembly 14 and imparts its energy to the blade assembly 14 in the manner previously described. The power and efficiency of the assembly 10e is advantageously increased since not only the linear momentum of the fluid used to apply force to the blades but also the angular momentum. Additionally, with the angular momentum component, the fluid flow 12 exiting the blade assembly 14 has minimal wake rotation reducing losses due to turbulence, which improves overall power and efficiency. The pitch on the stator blades can be adjusted to vary the amount of angular momentum induced and therefore the power output. The pitch can also be reversed to throttle or slow the turbine for safety reasons.

The assembly 10e also includes a slotted ejector arrangement 102 at the exit (ie. to tail end section 50b) of the shroud 50. The slotted ejector arrangement 102 rotates with the shroud 50. The gaps 104 between spaced apart sections 106 of the slotted ejector arrangement 102 allow fluid flowing around the exterior of the assembly 10e to effectively inject, as shown by arrows 108, into the fluid flow leaving the shroud. The effect of this additional fluid 108 is it induces a scavenging effect and increases the energy of the fluid leaving the shroud and causes more fluid to pass through the interior of the shroud 50, thereby improving the efficiency and power output of the assembly 10e.

Alternatively, the slotted ejector arrangement 102 can be mounted to the generator housing 34 and not rotate with the shroud 50.

Figure 6:
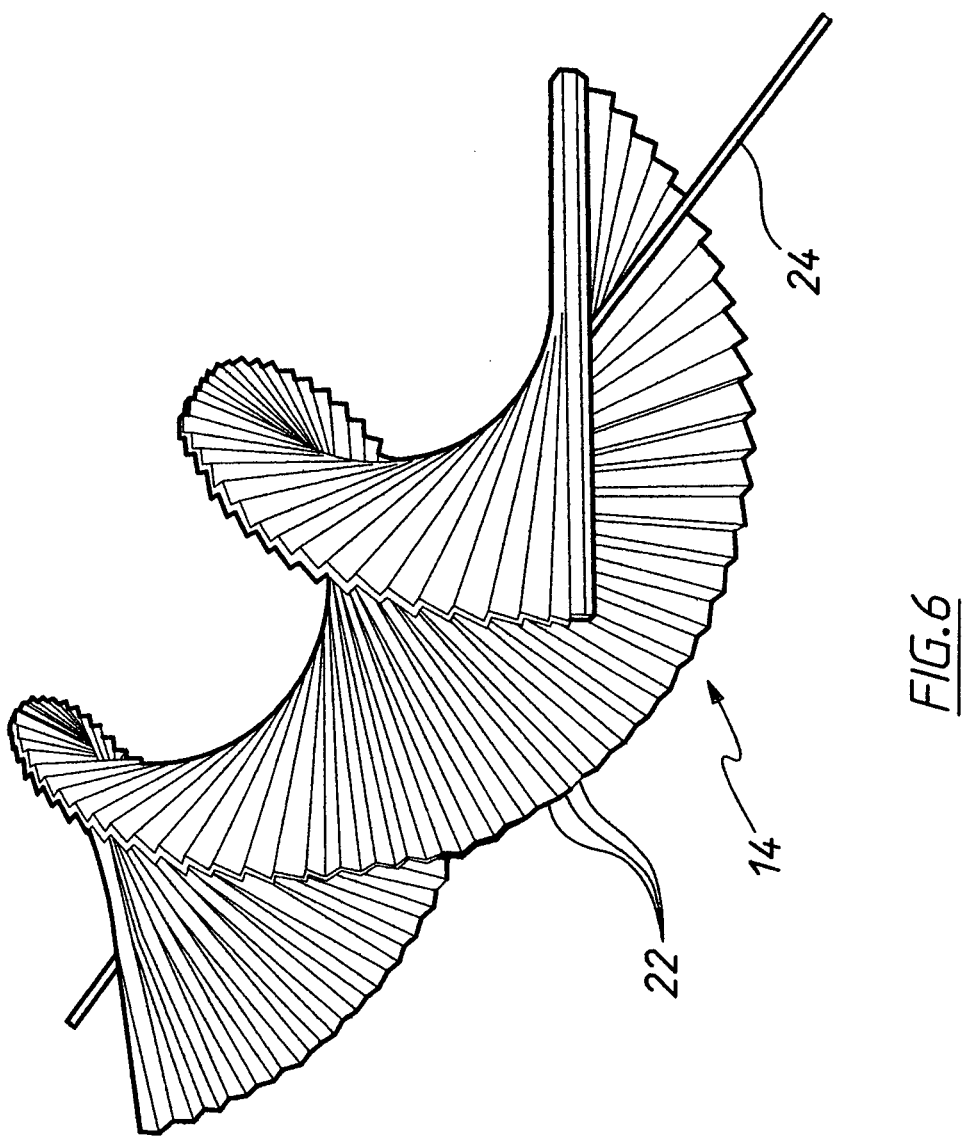
FIG. 6 is a perspective view of the blade assembly of the power generators shown in FIGS. 1 and 3.

FIG. 6 shows the blade assembly 14 used in the generator assemblies 10a and 10c shown in FIGS. 1 and 3 respectively.

Figure 7:
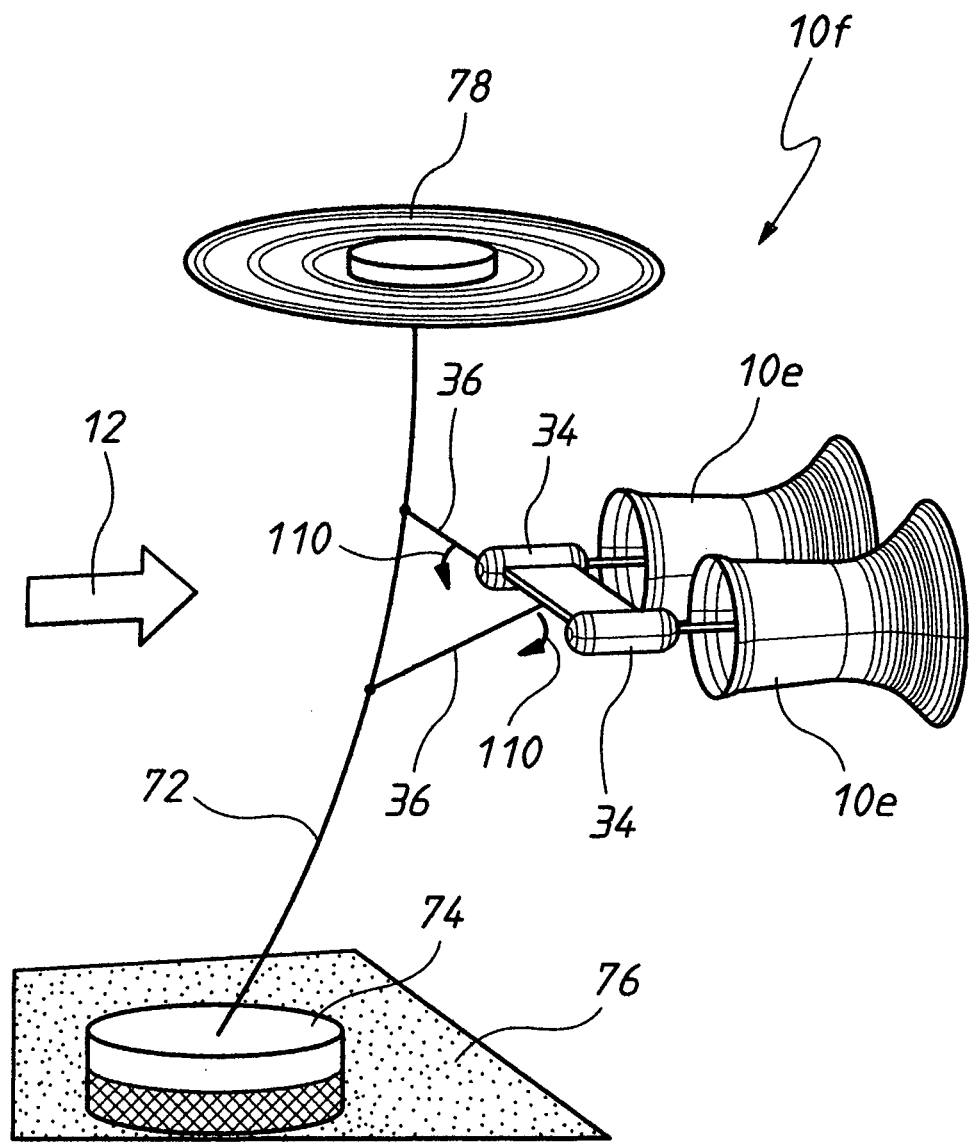
FIG. 7 is a perspective view of a sixth embodiment of a power generator.

FIG. 7 shows a sixth embodiment of electrical power generator assembly 10f which includes two of the assemblies 10e shown in FIG. 5. The blade assemblies 14 in the two assemblies 10e are configured to rotate in opposite directions, as indicated by arrows 110, such that the reactive torque imparted to the two generators 30 is equal in magnitude but opposite in direction and is effectively cancelled. As a result, the reactive torque transmitted into the stay cables 36 is minimised and the overall assemblies 10e advantageously do not try and rotate inside their mountings or through the cable 36.

Figure 8:
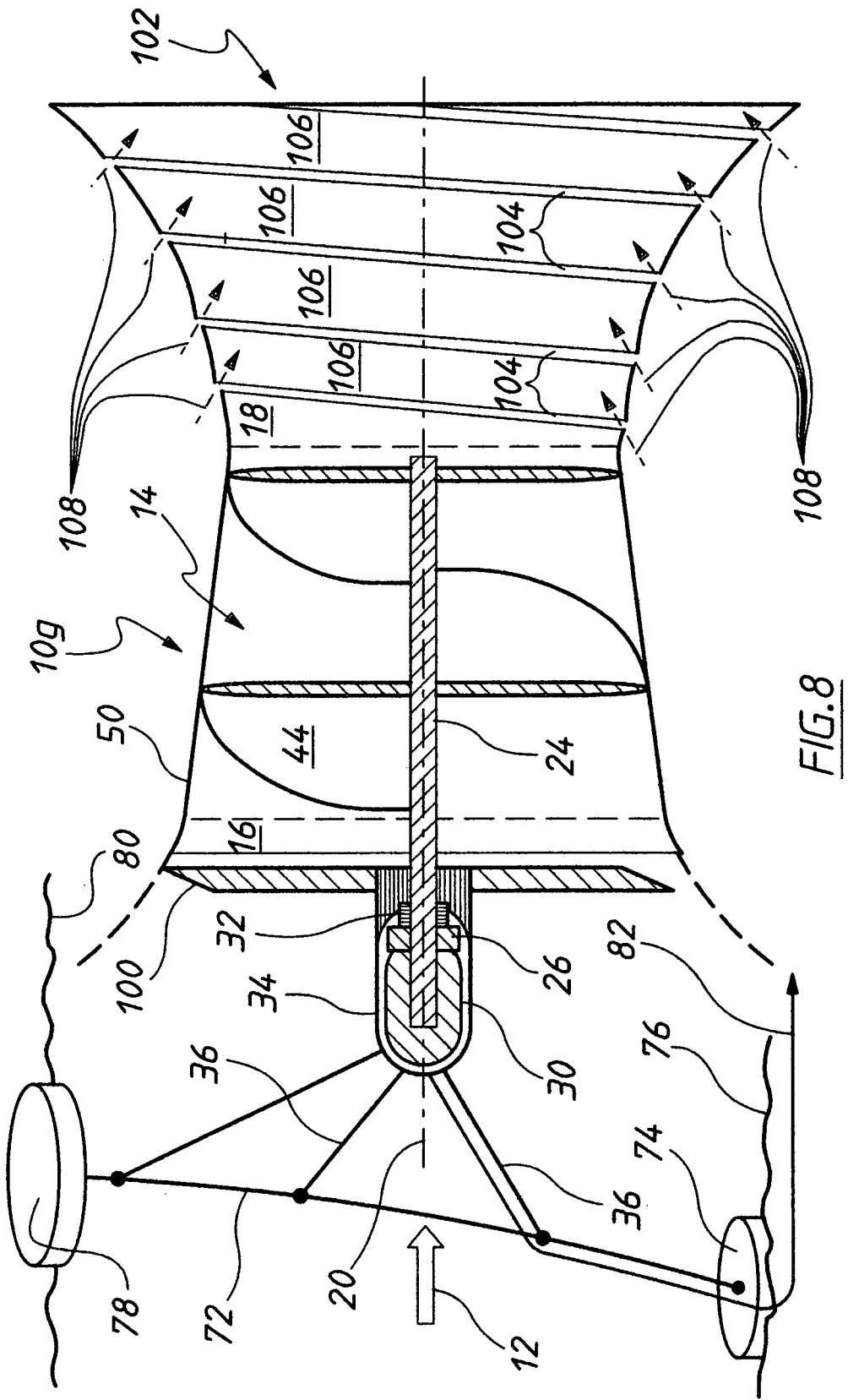
FIG. 8 is a schematic cross sectional view of a seventh embodiment of a power generator.

FIG. 8 shows a seventh embodiment of electrical power generator assembly 10g. The assembly 10g is similar to that shown in FIG. 6 except the slotted ejector arrangement is of unitary construction with a single helical slot forming the gaps 104 between the sections 106. It should be noted that the length of the slotted ejector 10g can be adjusted to change the width of the slots 104 to vary the effect of injection and power output. For example, the power generator may be installed with a long slotted ejector in slow flows to draw more water through and increase power output. In fast currents, a shorter slotted ejector may be utilised. Note also that the helical slotted ejector can be constructed from an elastic material such as aluminium so it can vary its shape depending on the force applied to it from the strength of the water flow.

Although the invention has been described with reference to preferred embodiments, it would be appreciated by persons skilled in the art that the invention may be embodied in many other forms. For example, the generator can be replaced with a motor which rotates the blade assemblies 14 and allows the assemblies 10 to act as propulsion devices or fluid pumps. In another example, the generator can be produced of strong, lightweight material and effectively used as a 'kite' in the wind. There are numerous options for the kite to power a generator such as a helium balloon buoying the weight of the generator and the kite providing mechanical power for the generator to produce electricity.

The invention claimed is:

1. A power generator assembly for using kinetic energy from a flowing fluid to generate power, the power generator assembly including:
    a blade assembly having a head end for facing oncoming flowing fluid, a tail end spaced from the head end for facing in the direction of flow of the fluid, and a rotational axis extending between the head end and the tail end, the blade assembly including a blade arrangement which is arranged in generally helical fashion about the rotational axis, and at least one mounting formation connected to the blade arrangement, each mounting formation being adapted to permit mounting of the blade assembly for rotation about its rotational axis, so that in use fluid flowing past the electrical power generator assembly interacts with the blade arrangement to rotate the blade assembly about its rotational axis;
    a stator including one or more blades of adjustable pitch;
    and a generator drivingly connected to the blade assembly for generating power in response to rotation of the blade assembly.

2. The power generator assembly as claimed in claim 1, wherein the power generator is an electrical power generator and includes an electrical generator drivingly connected to the blade assembly.

3. The power generator assembly as claimed in claim 1, wherein the power generator is a hydraulic power generator and includes a hydraulic generator drivingly connected to the blade assembly.

4. The power generator assembly as claimed in claim 3, wherein the hydraulic generator is in turn connected to an electric generator.

5. The power generator assembly as claimed in claim 1, wherein the power generator converts mechanical power from the blade assembly into another form of energy to do useful work.

6. The power generator assembly as claimed in claim 1, wherein the blade assembly includes an elongated shaft extending between the head end and the tail end of the blade assembly, the shaft having a longitudinal axis defining the rotational axis of the blade assembly, and the blade arrangement being mounted on and radiating from the shaft.

7. The power generator assembly as claimed in claim 6, wherein the generator is drivingly connected to the shaft.

8. The power generator assembly as claimed in claim 7, wherein the blade arrangement terminates shy of the ends of the shaft, with each mounting formation being provided by an end portion of the shaft, so that in use, the shaft, and accordingly the blade assembly, is rotatably mounted or supported.

9. The power generator assembly as claimed in claim 8, wherein each mounting formation includes a bearing element mounted on the shaft and adapted to be connected to a support structure, to permit rotation of the blade assembly relative to said support structure.

10. The power generator assembly as claimed in claim 1, wherein the blade arrangement includes a plurality of beams which are longitudinally spaced in said generally helical fashion along the shaft.

11. The power generator assembly as claimed in claim 10, wherein each beam is mounted on the shaft such that it is adjustably rotatable around the rotational axis of the shaft, to permit adjustment of the pitch of the blade assembly.

12. The power generator assembly as claimed in claim 11, wherein the blade arrangement further includes a web or skin extending along the lengths of and connected to each pair of adjacent beams, such that the blade arrangement, irrespective of the pitch of each beam, is uninterrupted across its surface.

13. The power generator assembly as claimed claim 1, wherein the blade arrangement includes one or more continuous helical blades.

14. The power generator assembly as claimed in claim 1, wherein the blade arrangement, when seen in side elevation, tapers from the head end thereof to its tail end.

15. The power generator assembly as claimed in claim 12, wherein the power generator assembly also includes an elongated open-ended shroud extending between the head end and the tail end of the blade assembly, the shroud being connected to and surrounding the blade assembly, so that the shroud rotates with the blade assembly in use.

16. The power generator assembly as claimed in claim 15, wherein the shroud has a head end and a tail end.

17. The power generator assembly as claimed in claim 15, wherein the shroud is connected to the tip of each blade of the blade arrangement, the connection between the shroud and each blade being a substantially fluid impervious connection.

18. The power generator assembly as claimed in claim 15, wherein the blade arrangement includes a plurality of beams and said webs or skins, a tip of each web or skin is also connected to the shroud.

19. The power generator assembly as claimed in claim 18, wherein the connections between the webs or skins and the shroud are substantially fluid impervious connections.

20. The power generator assembly as claimed in claim 16, wherein, in use, flowing fluid interacting with the blade arrangement to rotate the power generator assembly thus enters the shroud from its head end and exits the shroud via its tail end.

21. The power generator assembly as claimed in claim 16, wherein the shroud is of thin wall construction, and converges along at least part of its length from its head end to its tail end, said convergence corresponding to the tapering of the blade assembly.

22. The power generator assembly as claimed in claim 15, wherein the shroud is of multi-section or unitary moulded construction, having a head end section via which a flowing fluid enters the shroud, a tail end section via which flowing fluid exits the shroud, and an elongated intermediate section extending between the head end section and the tail end section, with the intermediate section converging from the head end section towards the tail end section.

23. The power generator assembly as claimed in claim 22, wherein the head end section of the shroud converges towards the intermediate section, and the tail end section diverges away from the intermediate section, such that the shroud is generally in the form of a converging-diverging venturi having a converging elongated throat defined by the intermediate section.

24. The power generator assembly as claimed in claim 22, wherein the shroud has a circular cross-sectional profile, and the head end section, or the head end section and the tail end section, of the shroud is/are flared in bell mouth fashion.

25. The power generator assembly as claimed in claim 1, wherein each mounting formation includes a bearing element connected to an end section of the shaft, the bearing elements in use being mounted on an anchored support structure, such that the power generator assembly rotates relative to the support structure.

26. The power generator assembly as claimed in claim 25, wherein the electrical power generator is in the form of a dynamo or alternator mounted on an end section of the shaft of the blade assembly and anchored to the support structure.

27. The power generator assembly as claimed in claim 15, wherein the stator is in front of the shroud.

28. The power generator assembly as claimed in claim 15, wherein the stator is adjacent the shroud head end section.

29. The power generator assembly as claimed in claim 1, wherein the power generator assembly includes a slotted ejector arrangement behind the shroud.

30. The power generator assembly as claimed in claim 29, wherein the slotted ejector arrangement is adjacent the shroud tail end section.

31. The power generator assembly as claimed in claim 29, wherein the slotted ejector arrangement is connected to, and rotates with, the shroud.

32. The power generator assembly as claimed in claim 29, wherein the slotted ejector arrangement is connected to the support structure and does not rotate with the shroud.

33. The power generator assembly as claimed in claim 29, wherein the slotted ejector arrangement includes a plurality of spaced apart tubular sections.

34. The power generator assembly as claimed in claim 33, wherein the slotted ejector arrangement diverges diametrically away from the shroud.

35. The power generator assembly as claimed in claim 29, wherein the slotted ejector arrangement is of unitary construction, with a helical slot therein.

36. The power generator assembly as claimed in claim 35, wherein the slotted ejector arrangement diverges diametrically away from the shroud.

37. A power generator assembly for using kinetic energy from a flowing fluid to generate power, the power generator assembly including:
   a blade assembly having a head end for facing oncoming flowing fluid, a tail end spaced from the head end for facing in the direction of flow of the fluid, and a rotational axis extending between the head end and the tail end, the blade assembly including a blade arrangement which is arranged in generally helical fashion about the rotational axis, and at least one mounting formation connected to the blade arrangement, each mounting formation being adapted to permit mounting of the blade assembly for rotation about its rotational axis, so that in use fluid flowing past the electrical power generator assembly interacts with the blade arrangement to rotate the blade assembly about its rotational axis;
   a slotted ejector arrangement with a helical slot therein;
   and a generator drivingly connected to the blade assembly for generating power in response to rotation of the blade assembly.

38. The power generator assembly as claimed in claim 37, wherein:
   the power generator assembly also includes an elongated open-ended shroud extending between the head end and the tail end of the blade assembly, the shroud being connected to and surrounding the blade assembly, so that the shroud rotates with the blade assembly in use; and
   the slotted ejector arrangement diverges diametrically away from the shroud.

* * * * *